(12) United States Patent
White, III et al.

(10) Patent No.: US 12,528,228 B2
(45) Date of Patent: Jan. 20, 2026

(54) METHODS FOR COMPLEX GEOMETRY MANDREL REMOVAL OF CERAMIC MATRIX COMPOSITE COMPONENTS

(71) Applicant: Raytheon Technologies Corporation, Farmington, CT (US)

(72) Inventors: Robert A. White, III, Meriden, CT (US); Andrew Joseph Lazur, La Jolla, CA (US); Mary Colby, West Hartford, CT (US); Howard J. Liles, Newington, CT (US); Robin H. Fernandez, East Haddam, CT (US)

(73) Assignee: RTX Corporation, Farmington, CT (US)

( * ) Notice: Subject to any disclaimer, the term of this patent is extended or adjusted under 35 U.S.C. 154(b) by 267 days.

(21) Appl. No.: 18/118,443

(22) Filed: Mar. 7, 2023

(65) Prior Publication Data
US 2024/0300142 A1    Sep. 12, 2024

(51) Int. Cl.
  *B28B 21/48*    (2006.01)
  *B28B 7/30*    (2006.01)
  *C04B 41/45*    (2006.01)
(52) U.S. Cl.
  CPC ............. *B28B 21/48* (2013.01); *B28B 7/30* (2013.01); *C04B 41/4531* (2013.01); *C04B 2235/614* (2013.01)
(58) Field of Classification Search
  CPC ....... B28B 21/48; B28B 7/30; C04B 41/4531; C04B 2235/614
  See application file for complete search history.

(56) References Cited

U.S. PATENT DOCUMENTS

| | | | |
|---|---|---|---|
| 10,202,860 | B2 | 2/2019 | Hillier |
| 11,396,814 | B2 | 7/2022 | Barker |
| 11,400,624 | B2 | 8/2022 | Blaney et al. |
| 2011/0274553 | A1 | 11/2011 | Stiesdal |
| 2015/0369052 | A1* | 12/2015 | de Diego ............... F01D 5/284 |
| | | | 29/889.71 |
| 2018/0236694 | A1 | 8/2018 | Eisch et al. |
| 2021/0381384 | A1* | 12/2021 | Barker ................... F01D 5/147 |

FOREIGN PATENT DOCUMENTS

EP    4325026 A1    2/2024

OTHER PUBLICATIONS

Extended European Search Report for European Patent Application No. 24161795.0, Dated Jul. 15, 2024, 9 Pages.

* cited by examiner

*Primary Examiner* — Jamel M Nelson
*Assistant Examiner* — Erica Hartsell Funk
(74) *Attorney, Agent, or Firm* — Kinney & Lange, P.A.

(57) ABSTRACT

A mandrel suitable for supporting an airfoil preform includes a first piece extending along a longitudinal axis of the mandrel, and a second piece in physical contact with the first piece at first interface region and extending along the longitudinal axis of the mandrel. The first piece is formed from a first material, and the second piece is formed from a second material.

16 Claims, 5 Drawing Sheets

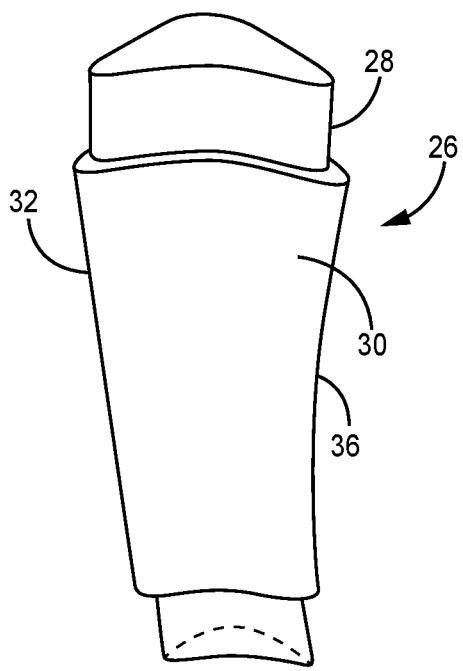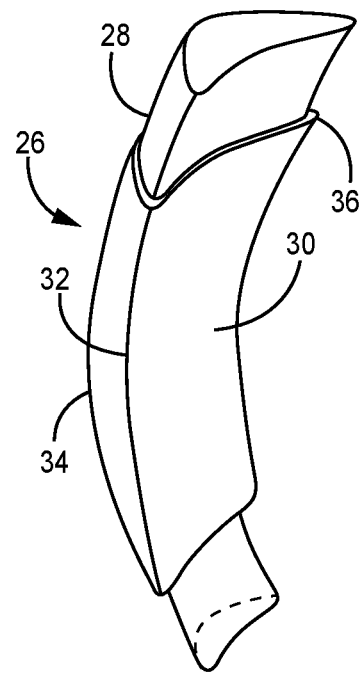
FIG. 2  FIG. 3

METHODS FOR COMPLEX GEOMETRY MANDREL REMOVAL OF CERAMIC MATRIX COMPOSITE COMPONENTS

BACKGROUND

The present invention relates to chemical vapor infiltration (CVI), and more particularly to improved tooling for CVI.

Ceramic matrix composite (CMC) parts are widely fabricated by densifying preforms made from woven fabrics or oriented/braided fiber tows. CVI is a commonly used densification technique practiced in industry. To keep a preform in a rigid form and maintain proper shape and geometry, specially designed tooling can be used to hold the preform during the initial densification cycle(s). Until the preform is adequately rigidized, the tooling must remain in contact with the preform to maintain integrity of the desired shape. In the case of hollow or cored CMC airfoil construction, the tooling which forms the internal surfaces must remain inside the part until it is partially or fully rigidized. In some instances, an issue may arise when attempting to extract the tooling after the component has been rigidized if the geometry is highly complex, the tooling is utilized as a partially enclosed core to shape/form the preform (i.e., a mandrel), or substantial surface deviations exist. Thus, means for releasing preforms from tooling without damaging the preforms are desirable.

SUMMARY

A mandrel suitable for supporting an airfoil preform includes a first piece extending along a longitudinal axis of the mandrel, and a second piece in physical contact with the first piece at first interface region and extending along the longitudinal axis of the mandrel. The first piece is formed from a first material, and the second piece is formed from a second material.

A mandrel suitable for supporting an airfoil preform includes a first piece formed from a first material, and a second piece formed from a second material and in physical contact with the first piece at an interface region. The interface region extends along a transverse axis of the mandrel.

A method of forming a ceramic matrix composite (CMC) airfoil includes wrapping a ceramic fabric around a mandrel, densifying the ceramic fabric using chemical vapor infiltration (CVI) to form the CMC airfoil, and removing the mandrel from the CMC airfoil by pulling a first piece of the mandrel out from a hollow core of the airfoil, and pulling a second piece of the mandrel out from the hollow core of the airfoil.

BRIEF DESCRIPTION OF THE DRAWINGS

FIGS. 2 and 3 are perspective views of a mandrel-mounted airfoil preform from the pressure side and leading edge, respectively.

Figure 1:
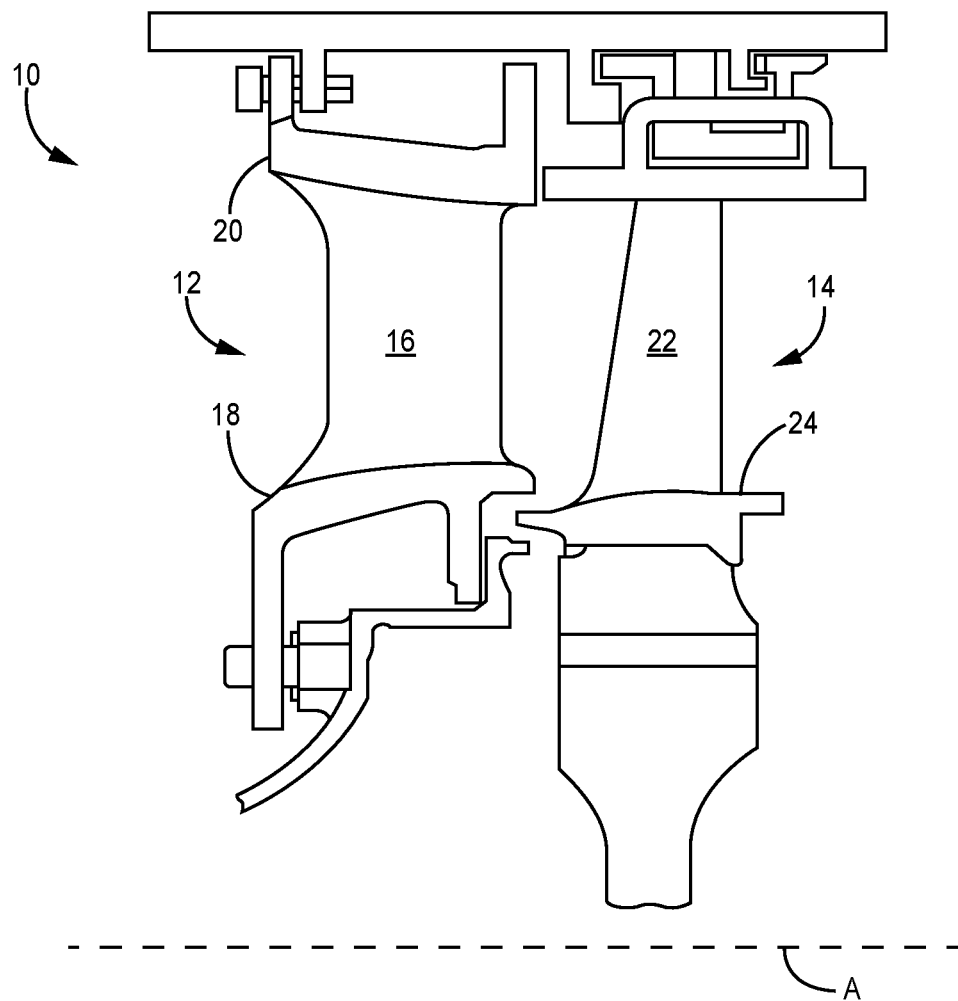
FIG. 1 is a simplified cross-sectional view of a portion of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various multipiece tooling assemblies for CVI. More specifically, mandrels can be segmented longitudinally and/or transversely, or off-angle segmented to facilitate removal from complexly shaped airfoil preforms. The removal of individual mandrel pieces helps minimize the type and/or extent of damage to a preform that can be caused by unitary mandrels.

FIG. 1 is a simplified cross-sectional view of a portion of gas turbine engine 10, showing vane assembly 12 and rotor assembly 14. Vane assembly 12 includes vane 16, inner diameter (ID) platform 18, and outer diameter (OD) platform 20. Rotor assembly 14 includes blade 22 and platform 24. Rotor assembly 14 is rotatable about engine axis A. The components of vane assembly 12 and rotor assembly 14 can be or can include CMCs formed from sheets/plies/cloths of ceramic fibers arranged in one of various two or three-dimensional woven architectures such as plain, harness (e.g., 3, 5, 8, etc.), twill, braid, or non-symmetric, or from non-woven (e.g., unidirectional, chopped, felted, etc.) fibers. The fibers can be reinforced with a ceramic matrix. The fibers and/or matrix can be formed from silicon carbide (SiC) or silicon nitride ($Si_3N_4$), to name a few non-limiting examples. To form the airfoil portions (i.e., vane 16 or blade 22) of vane assembly 12 and blade assembly 14, an airfoil-shaped preform can be formed by wrapping multiple plies around a mandrel having the desired airfoil shape.

FIG. 2 is a simplified perspective view of airfoil preform 26 mounted on mandrel 28, showing pressure side 30 of airfoil preform 26. FIG. 3 is a simplified perspective view of airfoil preform 26 mounted on mandrel 28, rotated from FIG. 2 to show leading edge 32. Airfoil preform 26 further includes suction side 34 (visible in FIG. 3) opposite pressure side 30, trailing edge 36 opposite leading edge 32, and a hollow core (not visible) occupied by mandrel 28. Airfoil preform 26 can be formed from fibrous ceramic plies. Mandrel 38 can be formed from at least one of graphite, carbon foam (e.g., reticulated vitreous carbon-RVC), a porous ceramic material, molybdenum, or carbon fiber. A molybdenum and/or carbon fiber mandrel 28 can further include a polymeric coating in one embodiment. Multiple materials can be incorporated into a single mandrel 28, for example, by forming different pieces from different materials and/or layering all or part of mandrel 28 with different materials. Depending on its material(s), mandrel 28 can be a single use or multi-use mandrel. For example, a mandrel 28 formed from carbon foam, carbon fiber, and/or or molybdenum can be more frangible than a mandrel 28 formed from one or more of the other exemplary materials, although traditional removal techniques can sometimes irreversibly damage mandrel 28 despite its material.

Mandrel 28 can further include perforations (not shown) for allowing reactant vapors to infiltrate airfoil preform 26 during CVI. After airfoil preform 26 is sufficiently rigidized/ densified, mandrel 28 can be removed. However, due to the curved geometry of airfoil preform 26 and the final CMC airfoil, it may be difficult to remove a unitary mandrel 28 without damaging the preform and/or mandrel 28. Additionally, airfoil preform 26 can become adhered to mandrel 28 if the preform material "pillows" into mandrel 28 perforations.

Figure 4A:
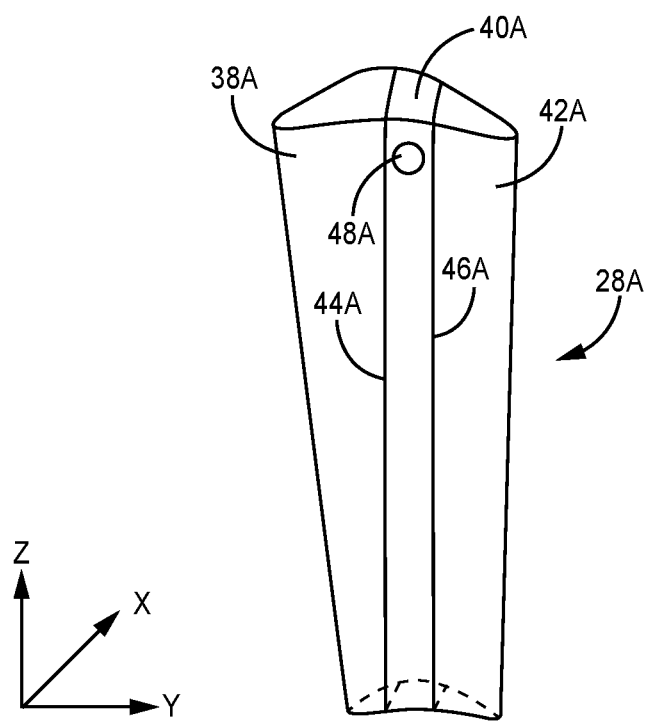
FIGS. 4A and 4B are simplified perspective views of first and second embodiments, respectively, of a segmented mandrel.
Figure 4B:
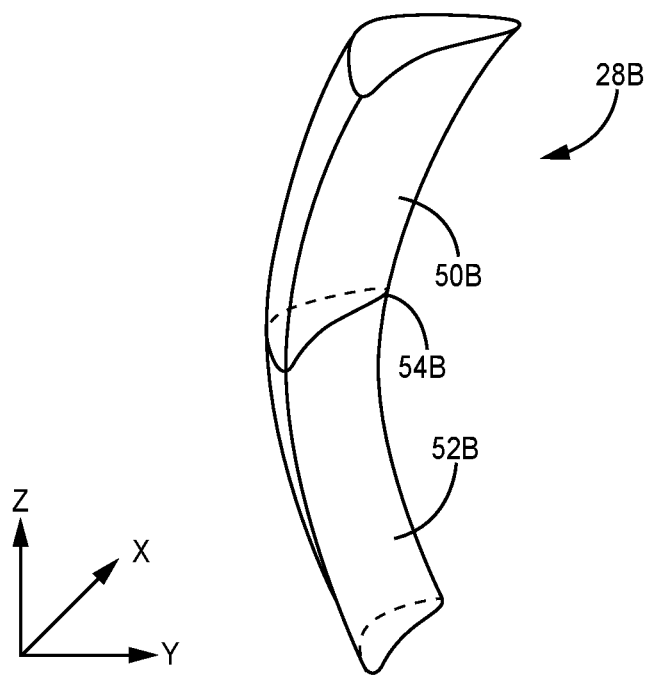

FIG. 4A is a simplified perspective view of a first embodiment of segmented mandrel 28A. FIG. 4B is a simplified perspective view of a second embodiment of segmented mandrel 28B. Segmented mandrels 28A and 28B can be more easily removed from an airfoil preform (e.g., airfoil preform 26) because they are formed from multiple pieces or sections that can be removed in sequence.

Segmented mandrel 28A is longitudinally segmented (i.e., with respect to the longitudinal z-axis of mandrel 28A), and includes three distinct pieces 38A, 40A, and 42A. Mandrel 28A has an airfoil shape corresponding to airfoil preform 26 such that piece 38A can be a leading edge piece, piece 40A a middle piece, and piece 42A a trailing edge piece. Piece 40A is in physical contact with piece 38A at interface 44A, and with piece 42A at interface 46A. Each piece 38A, 40A, and 42A can be formed from the same mandrel material, such as one discussed above with respect to mandrel 28, or different materials. Mandrel 28A can be single use, multi-use, or include a mixture of single and multi-use pieces. In an alternative embodiment, mandrel 28A can include just two pieces (e.g., just a leading edge piece and trailing edge piece), or more than three pieces (e.g., with multiple middle pieces). To remove mandrel 28A from an airfoil, piece 40A, having the least amount of surface area contact with the preform, can be removed first. To facilitate removal, piece 40A can optionally include aperture 48A into which a hook or pin can be inserted and used to pull piece 40A upward along the z-axis. Aperture 48A can extend partially or fully through piece 40A. Next, either piece 38A or piece 42A can be urged toward the other (i.e., along the y-axis) by hand or using a tool to free the respective piece from contact with the inner surface of the preform. Although shown extending primarily along the z-axis, middle piece 40A and interfaces 44A and 46A can alternatively be disposed at an angle (i.e., in the y-z plane) depending, for example, on preform geometry. Any of pieces 38A, 40A, and 42A can additionally and/or alternatively be formed with recesses to facilitate removal from the preform, act as conduits for reactant gas infiltration, or both.

Segmented mandrel 28B is transversely segmented and includes two pieces 50B and 52B in physical contact with one another at interface 54B. Interface 54B extends generally transversely (i.e., along the transverse y-axis of mandrel 28B), but can be angled, for example, in the y-z plane. Pieces 50B and 52B can be formed from the same mandrel material, such as one discussed above with respect to mandrels 28 and 28A, or different materials. Mandrel 28B can be single use, multi-use, or include a mixture of single and multi-use pieces. Mandrel 28B may be preferably used with preforms of highly bowed airfoils and/or those with internal hourglass-like curvature, where pulling a mandrel completely through such a preform along the z-axis can be difficult. Accordingly, to remove mandrel 28B from the airfoil, piece 50B can be pulled generally upward (along the z-axis) and piece 52B pulled generally downward. Interface 54B is shown disposed at a longitudinal midpoint of mandrel 28B, but can be longitudinally offset from the midpoint such that piece 50B is longer than piece 52B, or vice versa. Mandrel 28B can further be formed such that pieces 50B and 52B taper toward interface 54B such that mandrel 28B is narrowest at interface 54B, whatever its longitudinal position. This may be particularly beneficial for preforms with an internal hourglass-like geometry. Either or both pieces 50B and 52B can include an aperture (not shown) similar to aperture 48A to facilitate removal.

Figure 5A:
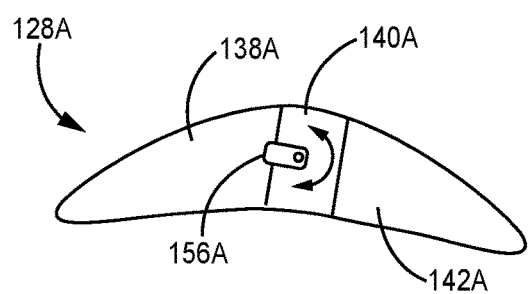
FIG. 5A is a simplified top view of a third embodiment of a segmented mandrel.

Mandrels 28A and 28B can include various optional features to prevent unwanted relative movement of the various pieces during layup and/or CVI. FIG. 5A is a simplified top view of mandrel 128A showing tab 156A. Tab 156A can minimize predominantly longitudinal movement, and some transverse movement of pieces 138A and 140A. Tab 156A can be rotatable, as indicated by directional arrows to engage with or disengage with any piece adjacent piece 140A. Tab 156A can additionally and/or alternatively be positioned on the bottom of mandrel 128A, on any piece (138A, 140A, or 142A) of mandrel 128A, or in another accessible location to allow for its dis/engagement as needed during processing.

Figure 5B:
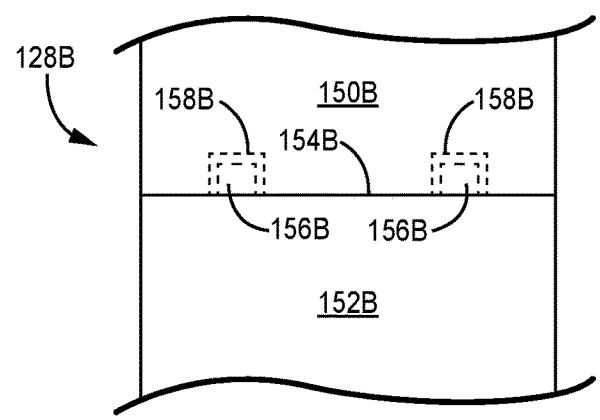
FIG. 5B is a simplified side view of a fourth embodiment of a segmented mandrel.

FIG. 5B is a simplified side view of a portion of mandrel 128B near interface 154B. As shown, mandrel 128B includes a male-female locking system including internal tabs 156B extending from piece 152B and received by corresponding internal slots 158B on piece 150B. The combination of tabs 156B and slots 158B can help minimize predominantly transverse movement, and some longitudinal movement of pieces 150B and 152B. Mandrel 128B can additionally and/or alternatively include external tabs (e.g., like tab 156A), or other releasable interlocking means, such as pins, wedges, clamps, etc.

Discussion of Possible Embodiments

The following are non-exclusive descriptions of possible embodiments of the present invention.

A mandrel suitable for supporting an airfoil preform includes a first piece extending along a longitudinal axis of the mandrel, and a second piece in physical contact with the first piece at first interface region and extending along the longitudinal axis of the mandrel. The first piece is formed from a first material, and the second piece is formed from a second material.

The mandrel of the preceding paragraph can optionally include, additionally and/or alternatively, any one or more of the following features, configurations and/or additional components:

The above mandrel can further include a third piece in physical contact with the first piece at a second interface region, and extending along the longitudinal axis of the mandrel.

In any of the above mandrels, the mandrel can have an airfoil shape.

In any of the above mandrels, the first piece can correspond to a middle section of the airfoil shape, the second piece can correspond to a leading edge section of the airfoil shape, and the third piece can correspond to a trailing edge section of the airfoil shape.

In any of the above mandrels, the third piece can be formed from a third material.

In any of the above mandrels, at least one of the first, second, or third materials can include graphite, carbon foam, a porous ceramic, molybdenum, or carbon fiber.

In any of the above mandrels, at least one of the first, second, or third materials can be frangible.

In any of the above mandrels, at least one of the first, second, or third pieces can include a tab engageable with an adjacent piece.

In any of the above mandrels, the first piece can include an aperture.

A mandrel suitable for supporting an airfoil preform includes a first piece formed from a first material, and a second piece formed from a second material and in physical contact with the first piece at an interface region. The interface region extends along a transverse axis of the mandrel.

The mandrel of the preceding paragraph can optionally include, additionally and/or alternatively, any one or more of the following features, configurations and/or additional components:

In the above mandrel, at least one of the first or second materials can include graphite, carbon foam, a porous ceramic, molybdenum, or carbon fiber.

In any of the above mandrels, the mandrel can be narrowest at the interface region.

In any of the above mandrels, the first piece can include a tab engageable with a slot within the second piece.

A method of forming a ceramic matrix composite (CMC) airfoil includes wrapping a ceramic fabric around a mandrel, densifying the ceramic fabric using chemical vapor infiltration (CVI) to form the CMC airfoil, and removing the mandrel from the CMC airfoil by pulling a first piece of the mandrel out from a hollow core of the airfoil, and pulling a second piece of the mandrel out from the hollow core of the airfoil.

The method of the preceding paragraph can optionally include, additionally and/or alternatively, any one or more of the following features, configurations and/or additional components:

In the above method, the first piece can extend completely through the hollow core of the airfoil and can be pulled out from the hollow core along a longitudinal direction of the mandrel.

Any of the above methods can further include, prior to pulling the second piece out from the hollow core of the airfoil, urging the second piece away from an inner surface of the airfoil along a transverse axis of the mandrel.

In any of the above methods, pulling the first piece out from the hollow core of the airfoil can include inserting a hook or a pin into an aperture in the first piece.

In any of the above methods, each of the first piece and the second piece can extend partially into the hollow core of the airfoil.

In any of the above methods, pulling the first piece out from the hollow core of the airfoil can include pulling the first piece in a first direction along a longitudinal axis of the mandrel.

In any of the above methods, pulling the second piece out from the hollow core of the airfoil can include pulling the second piece in a second direction along a longitudinal axis of the mandrel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mandrel suitable for supporting an airfoil preform, the mandrel comprising:
   a first piece extending along a longitudinal axis of the mandrel, wherein the first piece comprises an aperture extending transverse to the longitudinal axis and disposed adjacent to a first longitudinal end of the first piece, the aperture sized to receive a hook or pin for removing the mandrel from the airfoil preform;
   a second piece in physical contact with the first piece at a first interface region, and extending along the longitudinal axis of the mandrel; and
   a third piece in physical contact with the first piece at a second interface region, and extending along the longitudinal axis of the mandrel;
   wherein the first piece is formed from a first material; and
   wherein the second piece is formed from a second material.

2. The mandrel of claim 1, wherein the mandrel has an airfoil shape.

3. The mandrel of claim 2, wherein the first piece corresponds to a middle section of the airfoil shape, the second piece corresponds to a leading edge section of the airfoil shape, and the third piece corresponds to a trailing edge section of the airfoil shape.

4. The mandrel of claim 1, wherein the third piece is formed from a third material.

5. The mandrel of claim 4, wherein at least one of the first, second, or third materials comprises graphite, carbon foam, a porous ceramic, molybdenum, or carbon fiber.

6. The mandrel of claim 5, wherein at least one of the first, second, or third materials is frangible and at least one of the first, second, or third materials is non-frangible.

7. The mandrel of claim 1, wherein at least one of the first, second, or third pieces comprises a tab engageable with an adjacent piece.

8. The mandrel of claim 1, wherein the first piece of the mandrel comprises a tab disposed at the first or a second longitudinal end of the first piece, wherein the tab is rotatable to engage a respective first or second longitudinal end of the second piece of the mandrel.

9. A mandrel suitable for supporting an airfoil preform, the mandrel comprising:
   a first piece formed from a first material; and
   a second piece formed from a second material and in direct contact with the first piece at an interface region;
   wherein the interface region extends along a transverse axis of the mandrel.

10. The mandrel of claim 9, wherein at least one of the first or second materials comprises graphite, carbon foam, a porous ceramic, molybdenum, or carbon fiber.

11. The mandrel of claim 9, wherein the mandrel is narrowest at the interface region.

12. The mandrel of claim 9, wherein the first piece comprises a tab engageable with a slot within the second piece.

13. A method of forming a ceramic matrix composite (CMC) airfoil, the method comprising:
   wrapping a ceramic fabric around the mandrel of claim 1;
   densifying the ceramic fabric using chemical vapor infiltration (CVI) to form the CMC airfoil; and
   removing the mandrel from the CMC airfoil by:
      inserting a hook or pin into the aperture of the first piece of the mandrel and pulling the first piece of the mandrel out from a hollow core of the airfoil;
      pulling each of the second piece and third piece of the mandrel out from the hollow core of the airfoil following removal of the first piece of the mandrel.

14. The method of claim 13, wherein the first piece extends completely through the hollow core of the airfoil and is pulled out from the hollow core along a longitudinal direction of the mandrel.

15. The method of claim 14 and further comprising:
prior to pulling the second piece out from the hollow core of the airfoil, urging the second piece away from an inner surface of the airfoil along a transverse axis of the mandrel.

16. The method of claim 13, wherein pulling the first piece out from the hollow core of the airfoil comprises pulling the first piece in a first direction along a longitudinal axis of the mandrel.

\* \* \* \* \*